(12) United States Patent
Karaki et al.

(10) Patent No.: US 7,938,471 B2
(45) Date of Patent: *May 10, 2011

(54) DECK BOARD AND MOUNTING STRUCTURE OF DECK BOARD

(75) Inventors: Tatsuya Karaki, Aichi-ken (JP); Hiroyuki Suzuki, Aichi-ken (JP); Mikihiro Kito, Ichinomiya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 76 days.

This patent is subject to a terminal disclaimer.

(21) Appl. No.: 12/358,783

(22) Filed: Jan. 23, 2009

(65) Prior Publication Data

US 2009/0250958 A1    Oct. 8, 2009

(30) Foreign Application Priority Data

Apr. 4, 2008  (JP) ................................. 2008-098576

(51) Int. Cl.
 *B60R 7/08* (2006.01)
(52) U.S. Cl. ................. 296/37.16; 296/37.8; 296/37.14; 296/39.1; 224/542; 248/292.11; 248/352
(58) Field of Classification Search ................. 296/37.1, 296/37.2, 37.5, 37.8, 37.14, 37.16, 26.04, 296/26.06, 26.07, 39.1, 191, 124; 248/291.1, 248/292.11, 351, 352; 224/542
See application file for complete search history.

(56) References Cited

U.S. PATENT DOCUMENTS

| | | | |
|---|---|---|---|
| 4,718,584 A * | 1/1988 | Schoeny | 224/42.34 |
| 5,810,413 A * | 9/1998 | Siring et al. | 296/37.5 |
| 6,247,741 B1 * | 6/2001 | Seel et al. | 296/37.14 |
| 6,733,060 B1 * | 5/2004 | Pavkov et al. | 296/37.16 |
| 6,811,196 B2 * | 11/2004 | Gammon | 296/37.1 |
| 7,661,742 B2 * | 2/2010 | Medlar et al. | 296/37.16 |
| 2003/0222475 A1 | 12/2003 | Nakamitsu et al. | |
| 2007/0252401 A1 * | 11/2007 | Sumida et al. | 296/37.5 |

FOREIGN PATENT DOCUMENTS

| | | |
|---|---|---|
| DE | 10260524 | 7/2004 |
| DE | 202006007784 | 9/2006 |
| DE | 102007042371 | 3/2009 |
| JP | 2007-191127 A | 8/2007 |
| JP | 4038775 B2 | 11/2007 |
| WO | 03/104035 A1 | 12/2003 |

OTHER PUBLICATIONS

English language Abstract of DE 10260524, Jul. 15, 2004. English language Abstract of DE 102007042371, Mar. 12, 2009.
English language Abstract and translation of JP 2007-191127 A, Aug. 2, 2007.
English language translation of JP 4038775 B2, Nov. 16, 2007.

\* cited by examiner

*Primary Examiner* — Glenn Dayoan
*Assistant Examiner* — Gregory Blankenship
(74) *Attorney, Agent, or Firm* — Greenblum & Bernstein, P.L.C.

(57) ABSTRACT

A deck board includes a board body arranged in a luggage area of a vehicle so as to be capable of being moved between an upper position and a lower position. The board body in the upper position separates the luggage area into upper and lower areas. The deck board further includes a front support portion that is rotatably connected to the front side of the board body so as to support the front side of the board body. Further included is a support pin that pivotally supports the fore end portion of the front support portion on the opposite side of the board body, so that a hinge portion can rotate. The deck board further includes a tension spring arranged to bias the front side of the board body toward the support pin.

19 Claims, 13 Drawing Sheets

DECK BOARD AND MOUNTING STRUCTURE OF DECK BOARD

CROSS REFERENCE TO RELATED APPLICATION

The present application is based on and incorporates herein by reference Japanese Patent Application No. 2008-098576 filed on Apr. 4, 2008.

FIELD OF THE INVENTION

The present invention relates to a deck board arranged to separate a luggage area of a vehicle into upper and lower areas, and further relates to a mounting structure of the deck board.

BACKGROUND OF THE INVENTION

A mounting structure of a deck board, described in JP-A-2007-191127, is known as an example, in which the deck board is supported by a link mechanism so as to be capable of movement between upper and lower positions. The link arms of the link mechanism are arranged on the respective sidewalls of the luggage area. A support pin is provided on the distal end of each link arm so as to project into the vehicle interior. On the other hand, a bearing device for rotatably supporting the support pin projecting into the vehicle interior is bolted to the underside of the deck board.

However, according to the above structure, the components of the link mechanism should be arranged on the underside of the deck board and the sidewalls of the luggage area. Further, the components on the two sides should be linked when the deck board is mounted in the luggage area. Particularly, circular-arc grooves, for allowing the support pins to penetrate, should be formed through base plates mounted to the sidewalls of the luggage area. Thus, the number of components may be increased, and the mounting operation may be complicated.

SUMMARY OF THE INVENTION

The present invention was made in view of the foregoing circumstances, and an object thereof is to simplify a mechanism for moving a deck board between upper and lower positions so that the number of components is reduced, and further to facilitate the mounting operation for the deck board.

A deck board according to the present invention includes a board body arranged in a luggage area of a vehicle so as to be capable of being moved between an upper position and a lower position. The board body in the upper position separates the luggage area into upper and lower areas. The board body in the lower position is arranged on the side of the floor of the luggage area.

The deck board further includes a front support portion that is rotatably connected to the front side of the board body so as to support the front side of the board body, and a support pin that pivotally supports the end portion of the front support portion on the opposite side of the board body so that a connecting portion between the front support portion and the board body can rotate. Further included is a biasing device arranged to bias the front side of the board body toward the support pin.

According to the construction, the luggage area can be separated into upper and lower areas by the board body arranged in the upper position. When the deck board should be moved to the lower position, it is pulled rearward so that the board body is pulled out against the biasing force of the biasing device. The front support portion rotates around the support pin, and consequently transfers to a state of forming a single flat board together with the board body. Thereafter, the board body further moves toward the lower position due to the biasing force of the biasing device. Thus, the board body can be readily moved to the lower position.

According to the construction, the mechanism for moving the deck board between the upper and lower positions can be arranged solely on the deck board side. The mechanism is thus simplified so that the number of components is reduced. Further, the mounting operation for the deck board can be facilitated.

The following constructions are preferable according to some aspects of the present invention.

The board body can include a front board arranged in the front side and a rear board arranged in the rear side. The front support portion and the front board may be separated into a plurality of areas arranged along the vehicle width direction, by at least one slit that is formed thereon so as to extend in the front-to-rear direction. The biasing device can be arranged in at least one area of the plurality of areas so as to connect between the front support portion and the front board. The rear end portion of the at least one area may be rotatably connected to the rear board so that the at least one area can rotate separately from another area of the plurality of areas.

According to the construction, in the at least one area that includes the biasing device, the front support portion and the front board can be moved to approach each other without the curvature of the connecting portion therebetween being reversed, due to the biasing device connecting between the front support portion and the front board. In other areas that do not include the biasing device, the curvature of the connecting portion between the front support portion and the board body can be reversed with movement of the board body.

A pair of recess portions may be provided on the lateral sides of the front support portion so that a pair of protrusions, which are provided in the luggage area for supporting the lateral sides of the board body in the upper position, pass through the recess portions when the front support portion rotates.

According to the construction, the lateral sides of the board body in the upper position are supported by the protrusions, and therefore a bulky luggage can be placed thereon. Further, the protrusions can be prevented from interference with the front support portion when the board body is moved to the lower position, because the protrusions can pass through the recess portions.

According to the present invention, a mounting structure of a deck board can include a deck board described above, and a rear support portion provided on the rear wall on the rear side of the luggage area so as to support the rear side of the board body in the upper position. The support pin can be detachably supported on the sidewalls on the lateral sides of the luggage area.

According to the construction, the deck board can be readily mounted to the sidewalls of the luggage area.

A protective wall maybe provided on the floor of the luggage area so as to be arranged on a lateral side of the biasing device when the board body is in the lower position.

According to the construction, the protective wall can separate the biasing device from the luggage area, and thereby protect the biasing device.

According to the present invention, a mechanism for moving a deck board between upper and lower positions can be simplified, resulting in reduction of the number of components. Further, the mounting operation for the deck board can be facilitated.

BRIEF DESCRIPTION OF THE DRAWINGS

The above and other features and advantages of the present invention will become more apparent from the following detailed description made with reference to the accompanying drawings. In the drawings.

DETAILED DESCRIPTION OF THE INVENTION

Embodiment 1

Figure 1:
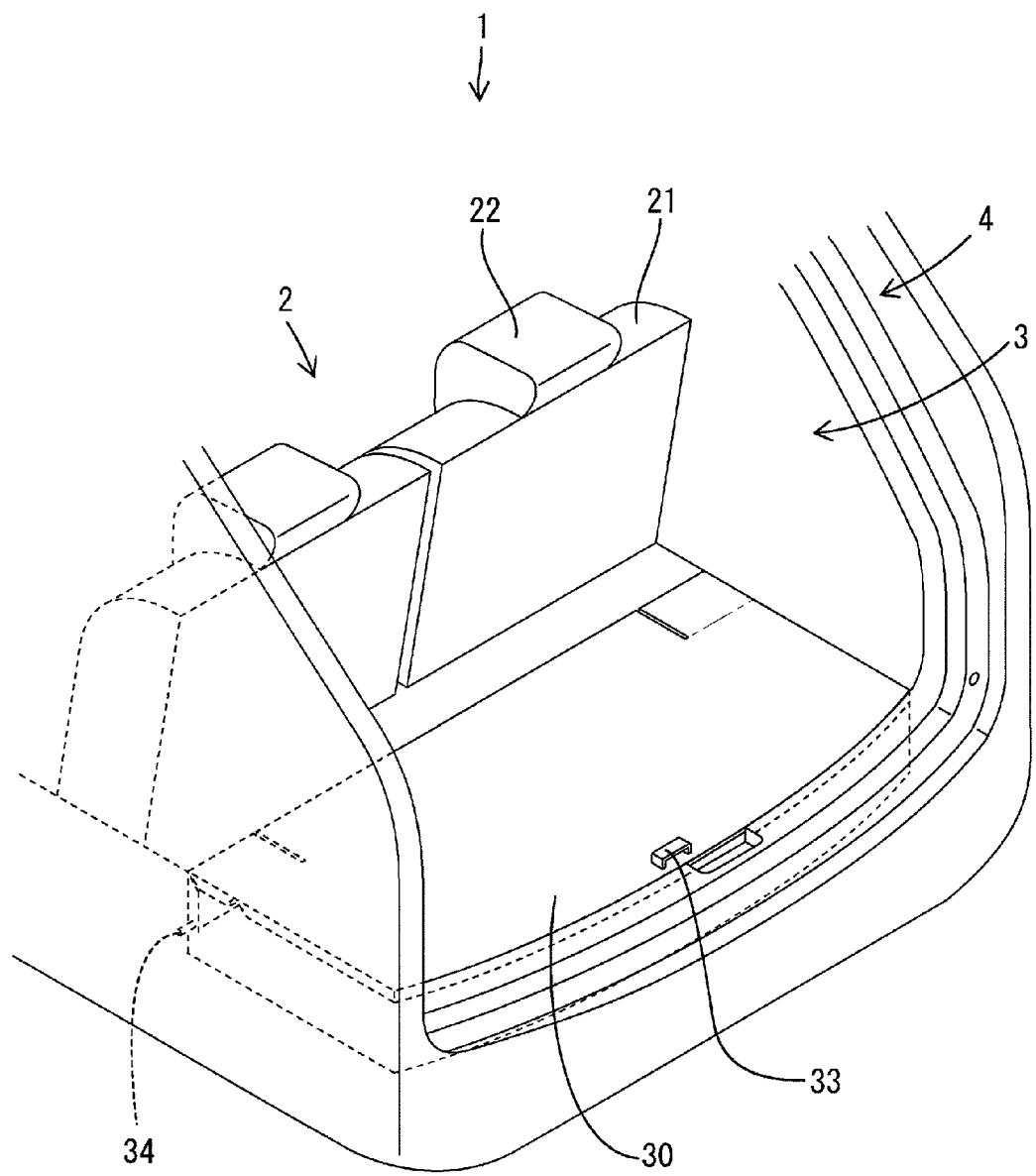
FIG. 1 is a top perspective view of a luggage area according to an embodiment 1.

An embodiment 1 according to the present invention will be hereinafter explained with reference to FIGS. 1 to 10. FIG. 1 is a top perspective view of a vehicle 1 having a rear door (not shown), such as a minivan or a station wagon. In the vehicle 1, a luggage area 3 is provided on the rear side of the rear seats 2. Further, a rear opening 4 is provided on the rear side of the luggage area 3 when the rear door is opened. A luggage can be put in the luggage area 3 through the rear opening 4.

Figure 5:
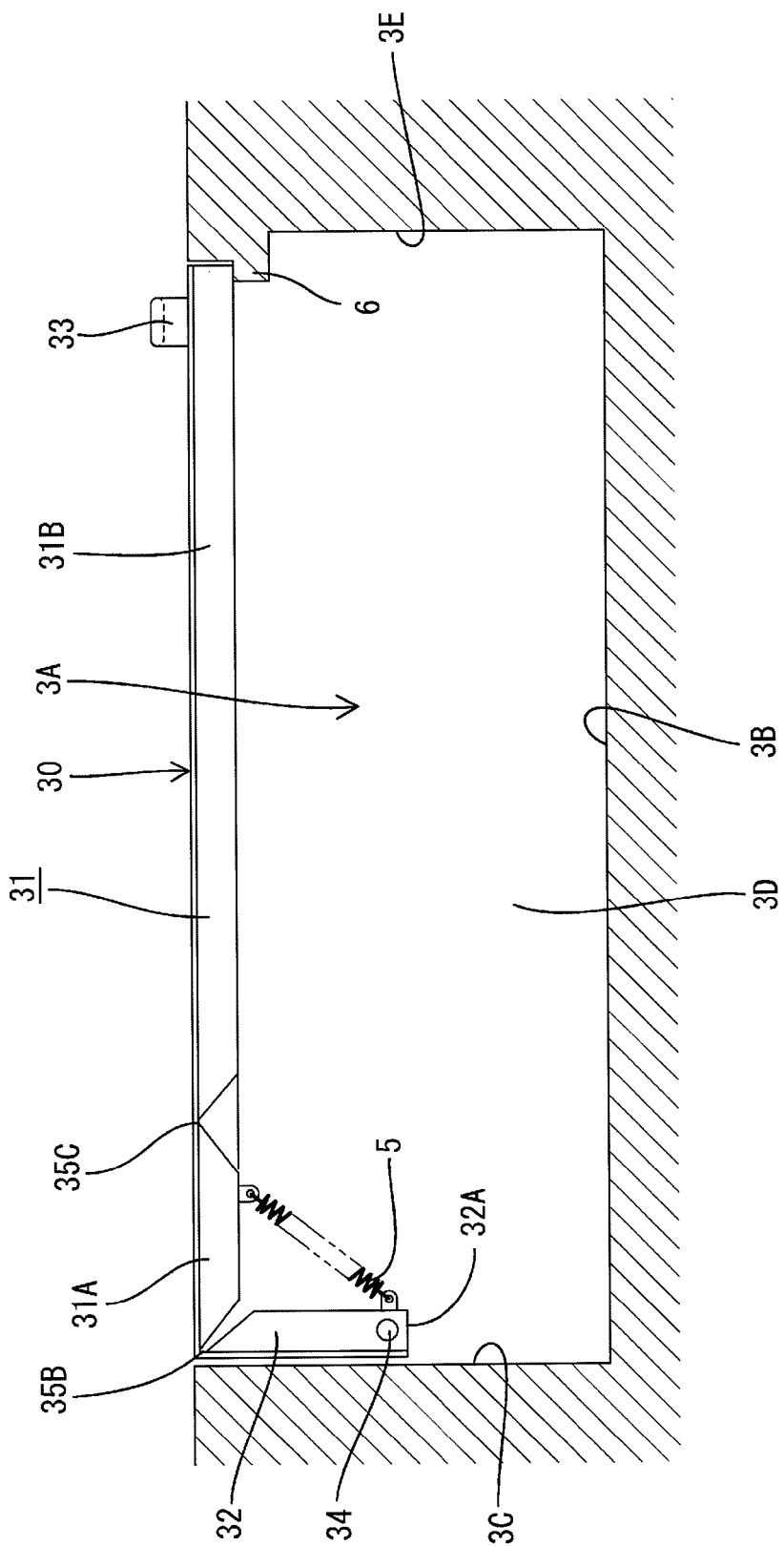
FIG. 5 is a cross-sectional side view showing the deck board arranged in the upper position.
Figure 8:
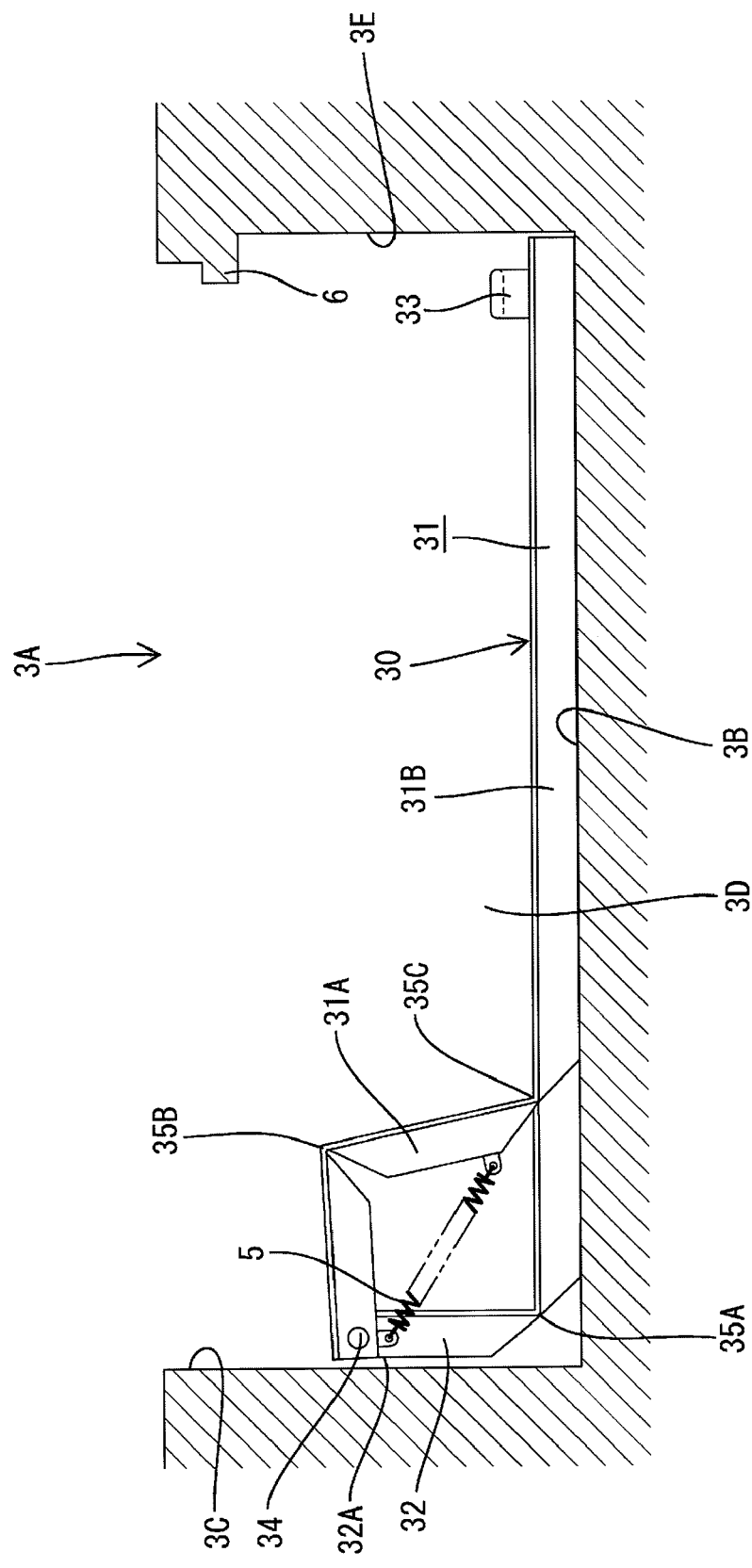
FIG. 8 is a cross-sectional side view showing the deck board arranged in the lower position.

The luggage area 3 can be separated into two areas, i.e., an upper area and a lower area, by a deck board 30 arranged in an upper position (as shown in FIG. 5). When the deck board 30 rests in a lower position (as shown in FIG. 8), a large luggage area is provided so that a bulky luggage can be carried therein. Hereinafter, the lower luggage area, when the luggage area 3 is separated into upper and lower areas, is referred to as an undertray 3A.

The rear seats 2 are provided as a split-folding seat, which include backrests 21 for supporting the backs and waists of seat occupants (not shown), and further includes headrests 22 for supporting the heads of the seat occupants. Reclining mechanisms (not shown) are provided on the rear seats 2, in order to enable adjustment of the angles of the backrests 21.

If the backrest 21 is folded forward, the luggage area 3 is extended so that a bulky luggage can be carried therein. The top surface of the deck board 30 in the upper position can be flush with the rear surface of the folded backrest 21.

The deck board 30 in the upper position is located at a predetermined height from a floor 3B that forms the underside of the undertray 3A. The deck board 30 is held in a horizontal position, so that the top surface thereof is level with the lower end of the rear opening 4. Thereby, a luggage on the top surface of the deck board 30 can be easily taken out.

The floor 3B forms a flat surface, which can be provided as a part of the vehicle body, or alternatively, can be formed of a plate made of a synthetic resin material or wood-based material.

Figure 2:
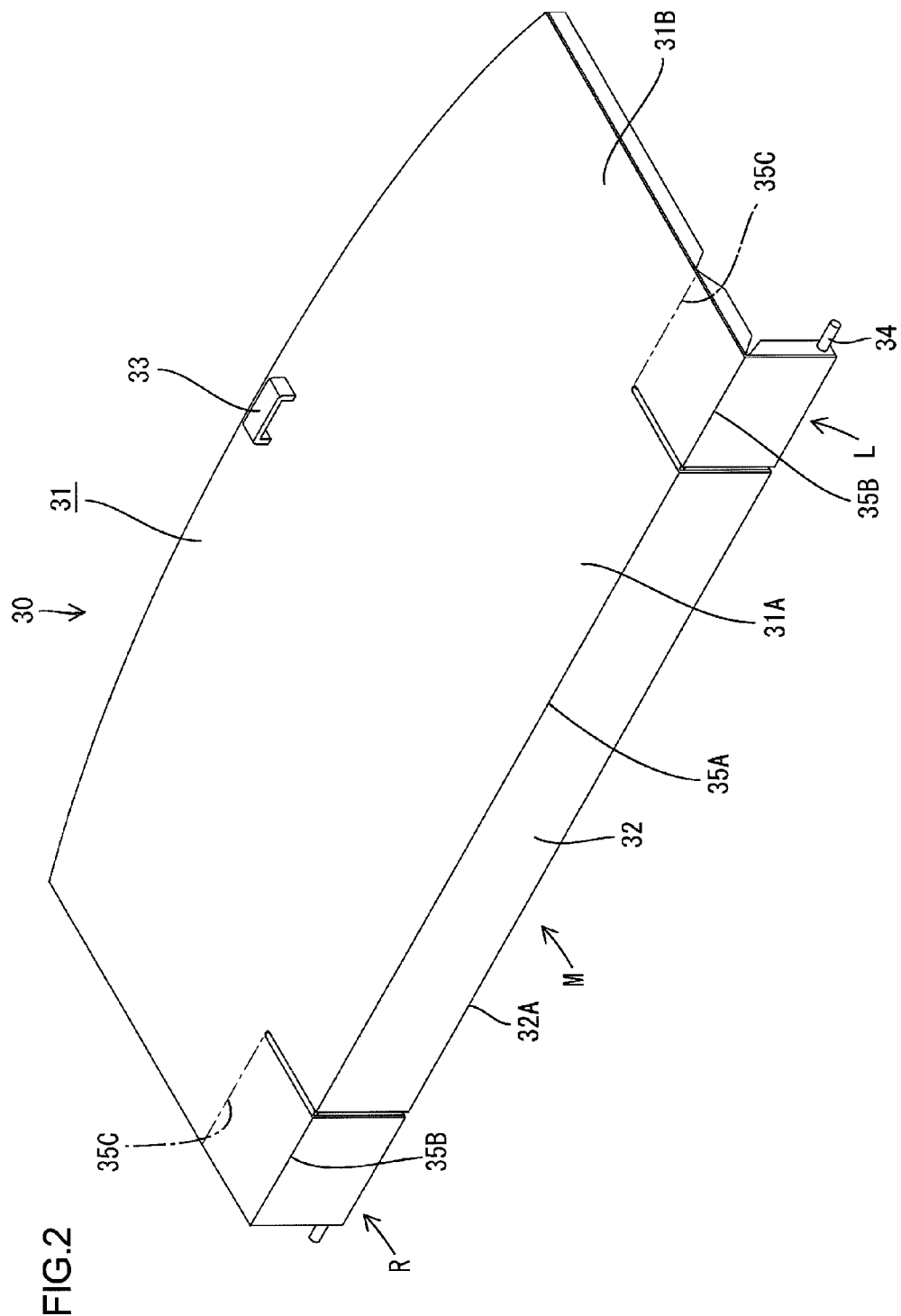
FIG. 2 is a perspective view showing the top surface of a deck board arranged in the upper position.

Referring to FIG. 2, the deck board 30 includes a board body 31 arranged in a horizontal position, a front support portion 32 rotatably connected to the front end portion of the board body 31, and a handle portion 33 attached to the rear end area of the top surface of the board body 31.

A support pin 34, extending in the vehicle width direction, penetrates the fore end portion 32A (i.e., the end portion on the opposite side of the board body 31) of the front support portion 32. Thereby, the front support portion 32 is pivotally supported. The support pin 34 is detachably supported on the sidewalls 3D on the lateral sides of the undertray 3A.

Hereinafter, a portion of any component that is positioned at one end thereof in the vehicle width direction, or a side of that portion, is referred to as "a lateral side of the component".

The front support portion 32 and the part of the board body 31 connected thereto are separated into three areas, by slits which are formed thereon so as to extend in the front-to-rear direction.

Hereinafter, the area of the three areas, positioned at the center in the vehicle width direction, is referred to as a middle area M (i.e., an example of "another area" of the present invention). The area of the three areas, positioned on the left side of the vehicle, is referred to as a left area L (i.e., an example of "one area" of the present invention). The area of the three areas, positioned on the right side of the vehicle, is referred to as a right area R (i.e., an example of "one area" of the present invention).

The portion of the board body 31, separated into the three areas, is referred to as a front board 31A, while the remaining portion on the rear side of the front board 31A is referred to as a rear board 31B.

In the middle area M, the front board 31A is rotatably connected to the front support portion 32 by a first hinge portion 35A (i.e., an example of "a connecting portion" of the present invention) having flexibility. In the right and left areas R, L, the front board 31A is rotatably connected to the front support portion 32 by second hinge portions 35B (i.e., an example of "a connecting portion" of the present invention) having flexibility. Further, in the middle area M, the rear board 31B is connected to the front board 31A so as not to be rotatable and so as to together form a single board. In the right and left areas R, L, the rear board 31B is rotatably connected to the front board 31A by third hinge portions 35C (i.e., an example of "a rear end portion of one area" of the present invention) having flexibility.

Figure 3:
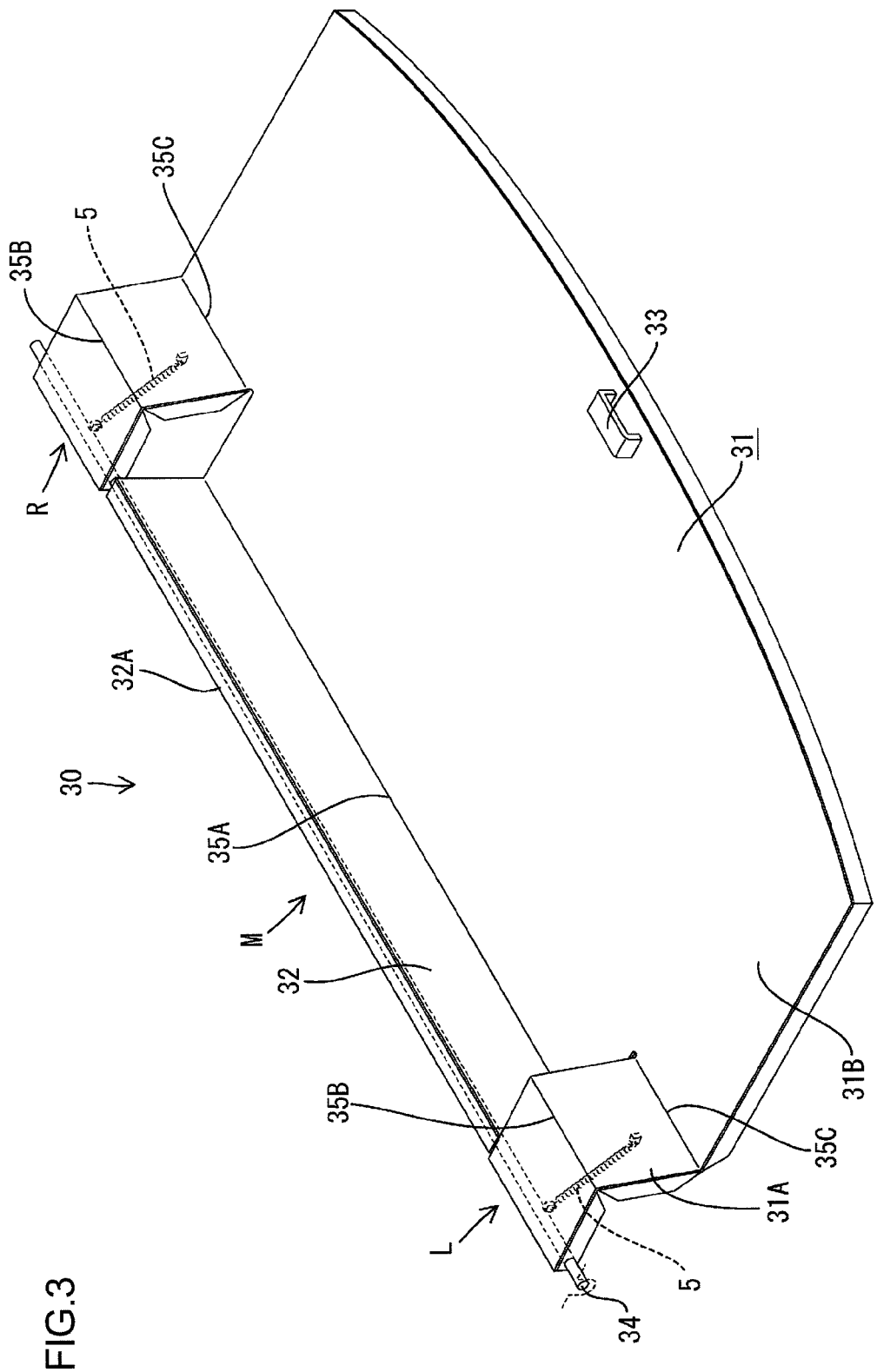
FIG. 3 is a perspective view showing the top surface of the deck board arranged in the lower position.

According to the construction, the arrangement in the right and left areas R, L can be changed so that the front board 31A is raised from the rear board 31B and the front support portion 32 is substantially parallel to the rear board 31B, as shown in FIG. 3. At the time, the first hinge portion 35A and the second hinge portions 35B are bent into angular shapes bulging away from each other.

Figure 4:
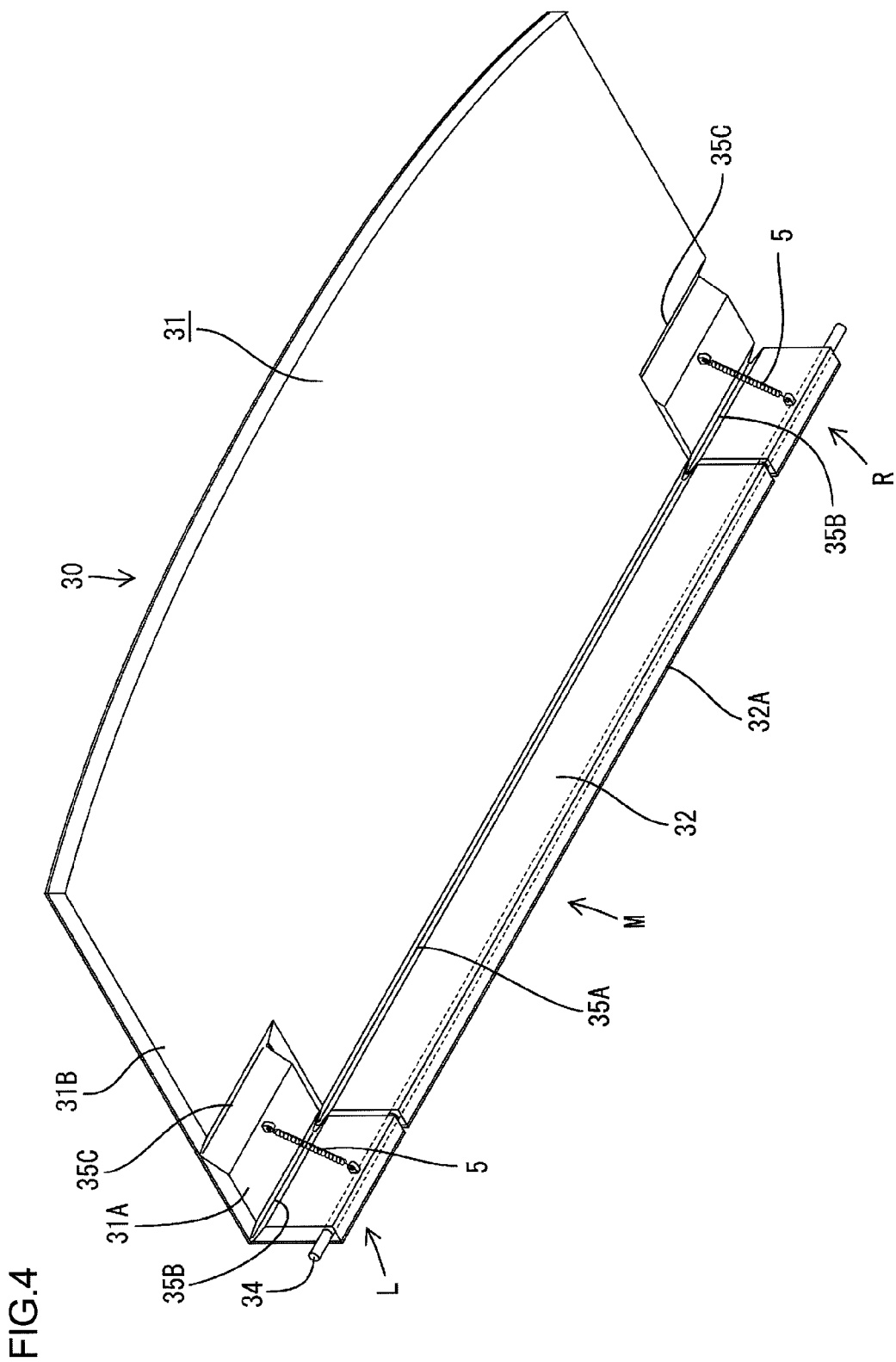
FIG. 4 is a perspective view showing the underside surface of the deck board arranged in the upper position.

Referring to FIG. 4, tension springs 5 (i.e., an example of "a biasing device" of the present invention) are provided in the respective right and left areas R, L. Each tension spring 5 connects between the front support portion 32 and the front board 31A across the second hinge portion 35B. Thereby, the front support portion 32 and the front board 31A are biased to be drawn to each other across the second hinge portion 35B.

The deck board 30 of the present embodiment can be moved between the upper position and the lower position, as described above. The deck board 30 in the upper position separates the luggage area 3 of the vehicle 1 into upper and lower areas. The deck board 30 in the lower position rests on the floor 3B of the undertray 3A.

FIG. 5 shows the deck board 30 arranged in the upper position. A rear support portion 6 is provided on the rear wall 3E on the rear side of the undertray 3A, so as to support the rear end portion of the board body 31 arranged in the upper position. That is, the board body 31 in the upper position is supported at two points, i.e., at front and rear points, by the front support portion 32 and the rear support portion 6, respectively.

On the other hand, FIG. 8 shows the deck board 30 arranged in the lower position. In the present embodiment, the board body 31 in the lower position is supported by the whole surface of the floor 3B of the luggage area 3.

When the board body 31 is set in the upper position, the front support portion 32 is arranged along the front wall 3C on the front side of the undertray 3A, as shown in FIG. 5. The fore end portion 32A of the front support portion 32 is pivotally supported by the support pin 34. Therefore, the first hinge portion 35A can rotate around the axis of the support pin 34, when the board body 31 is moved from the upper position to the lower position.

When the board body 31 is set in the lower position, the front support portion 32 is arranged along the front wall 3C of the undertray 3A, as shown in FIG. 8. Then, the fore end portion 32A of the front support portion 32 is also pivotally supported by the support pin 34.

Figure 9:
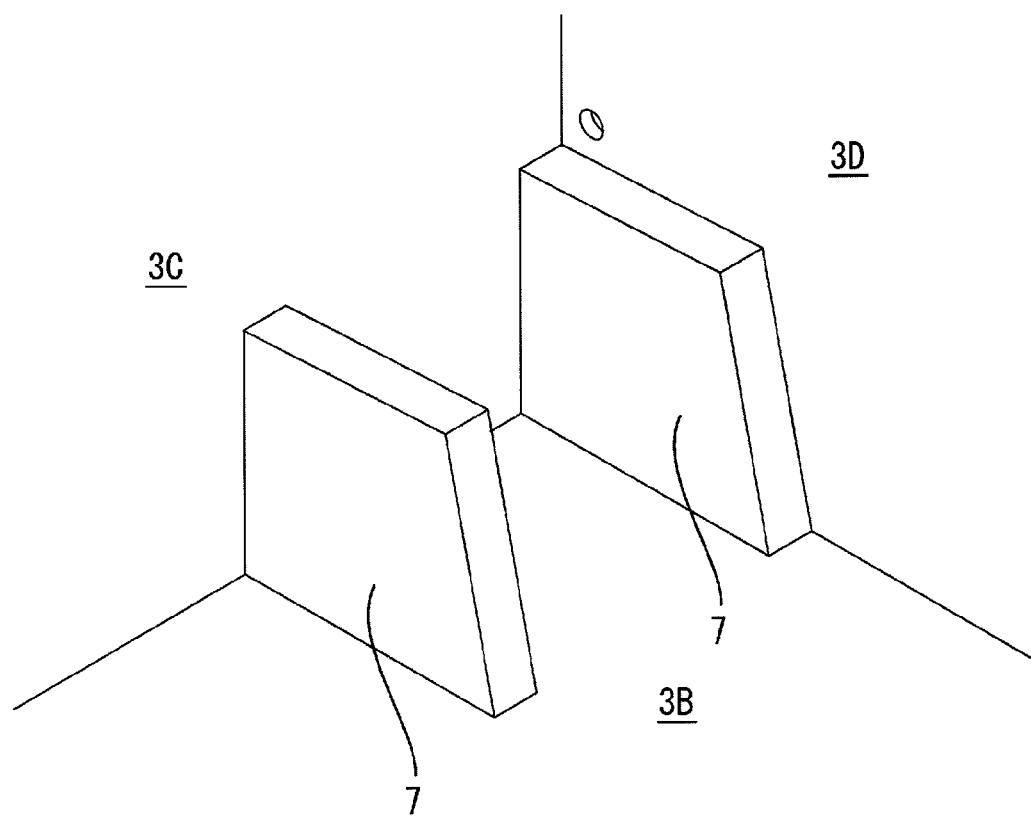
FIG. 9 is a top perspective view of protective walls.

Further, a pair of protective walls 7 is provided on the floor 3B of the undertray 3A as shown in FIG. 9, so as to be arranged on the lateral sides of each tension spring 5 when the deck board 30 is set in the lower position. A pair of protective walls 7 is provided on each lateral side of the floor 3B, so as to correspond to the tension spring 5.

Figure 10:
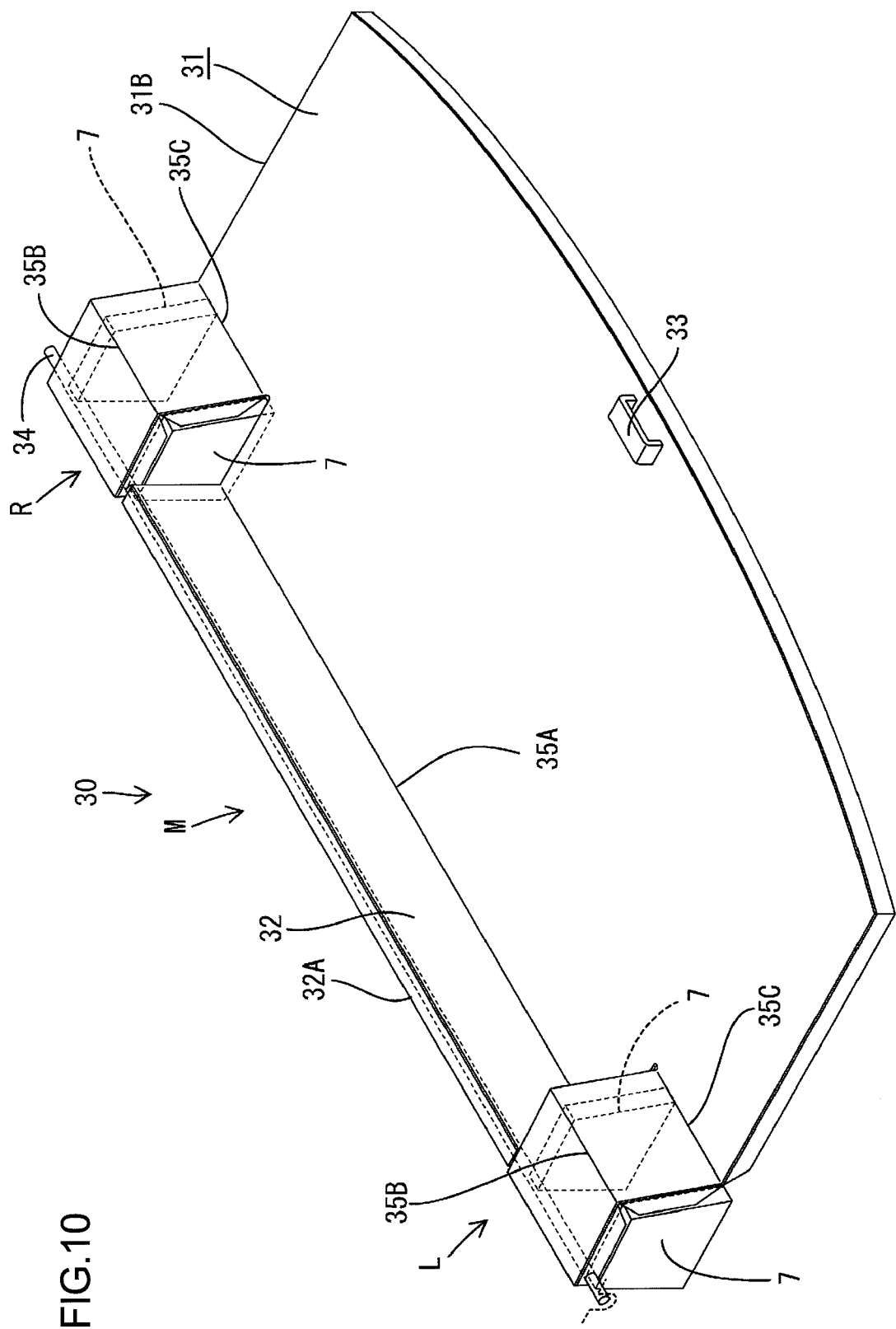
FIG. 10 is a top perspective view of the luggage area when the deck board is arranged in the lower position.

Referring to FIG. 10, the shapes of the protective walls 7 substantially coincide with those of lateral openings which are formed on the right and left areas R, L by the front support portion 32 and the front board 31A. Due to the protective walls 7 thus constructed, the tension springs 5 can be separated from the luggage area 3, and therefore are secure from being damaged by a luggage placed in the luggage area 3.

In the present embodiment, due to the utilization of elastic forces of the tension springs 5, the deck board 30 can be readily moved from the upper position to the lower position in order to put away the deck board 30, and can be readily moved from the lower position to the upper position in order to separate the luggage area 3 into upper and lower areas. The operation will be hereinafter explained.

Figure 6:
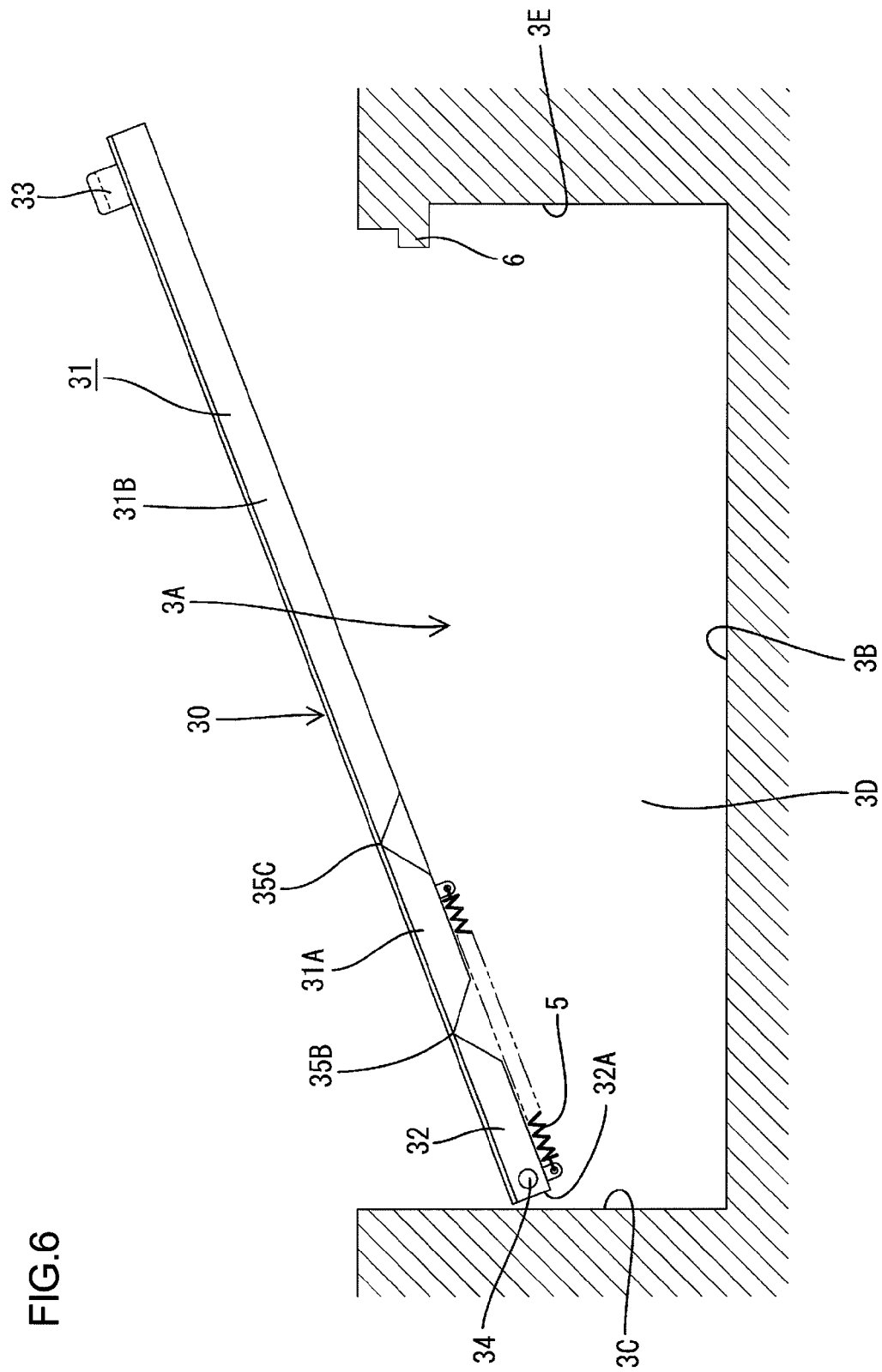
FIG. 6 is a cross-sectional side view showing the deck board that is pulled out so as to form a flat board protruding rearward.

First, when the deck board 30 is moved from the upper position to the lower position, the handle portion 33 is grasped and pulled rearward so that the board body 31 is pulled out against the elastic forces of the tension springs 5. Then, the front support portion 32 rotates around the axis of the support pin 34, and the deck board 30 becomes flat as shown in FIG. 6.

Figure 7:
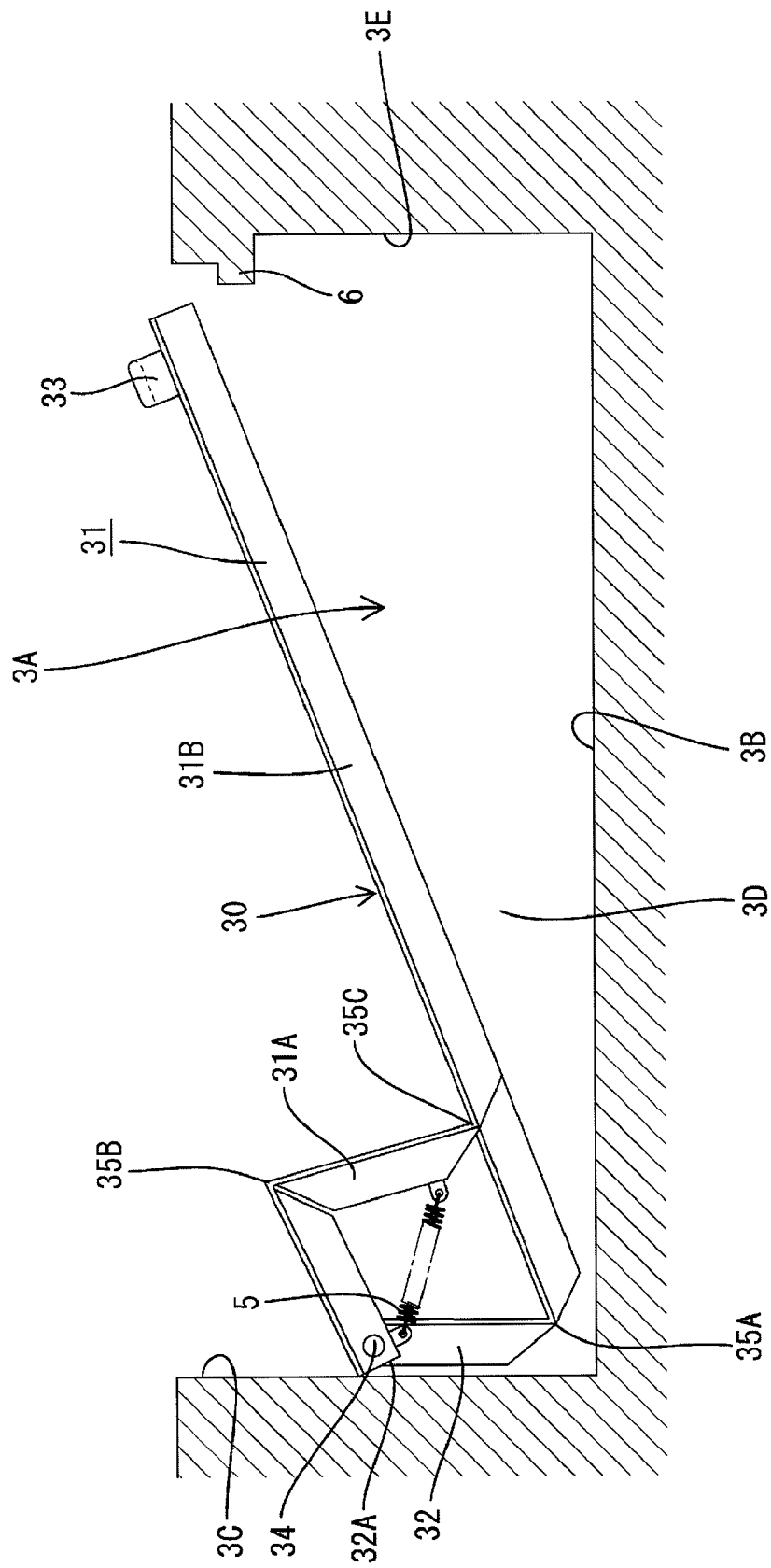
FIG. 7 is a cross-sectional side view showing when a first hinge portion and second hinge portions are bent into angular shapes bulging away from each other.

Thereafter, the front support portion 32 will continue to rotate due to the inertial force. Therefore, in the middle area M, the first hinge portion 35A moves to approach the floor 3B, as shown in FIG. 7. However, in the right and left areas R, L, the tension springs 5 cause the front support portion 32 and the front board 31A to be drawn to each other.

Consequently, the second hinge portions 35B are bent to bulge upward or reversely from the first hinge portion 35A. At the time, the third hinge portions 35C are pulled toward the support pin 34 due to the elastic forces of the tension springs 5, and thereby the front support portion 32 in the middle area M rotates to approach the front wall 3C of the undertray 3A.

When the handle portion 33 is thereafter released, the board body 31 rotates around the first hinge portion 35A so as to move downward due to its own weight. Consequently, the board body 31 rests on the floor 3B as shown in FIG. 8.

Thus, the deck board 30 can be moved from the upper position to the lower position, simply by pulling out the board body 31 so that the front support portion 32 and the board body 31 together form a single flat board protruding rearward. Thereafter, the deck board 30 automatically transfers to a state shown in FIG. 7, due to the tension springs 5. Then, the board body 31 can be dropped on the floor 3B when the handle portion 33 is released, resulting in the deck board 30 in the lower position.

The deck board 30 can be moved from the lower position to the upper position in a similar manner. That is, as described above, the handle portion 33 is pulled upward and rearward, so that the deck board 30 transfers to a state shown in FIG. 6. Then, the first hinge portion 35A will continue to rotate due to the inertial force, so as to approach the front wall 3C of the undertray 3A. Consequently, the front support portion 32 is arranged along the front wall 3C, further due to the elastic forces of the tension springs 5.

If the handle portion 33 is released, the board body 31 rotates around the first hinge portion 35A and around the second hinge portions 35B so as to approach the floor 3B. Then, the deck board 30 is arranged in the upper position, while the rear end portion of the board body 31 is supported on the rear support portion 6.

The support pin 34 is detachably supported on the sidewalls 3D of the undertray 3A, and therefore the deck board 30 can be readily detached when the deck board 30 is not necessary. Further, the deck board 30 can be readily attached when necessary.

As stated above, in the present embodiment, the mechanism for moving the deck board 30 between the upper and lower positions is arranged solely on the deck board 30 side. Therefore, the deck board 30 can be readily mounted in the luggage area 3, without complicated operations for connecting between components on the deck board 30 and components on the luggage area 3.

Further, a simple link mechanism is achieved by using the tension springs 5 and the hinge portions 35A, 35B and 35C, instead of a complicated link mechanism. Thereby, the number of components can be greatly reduced.

Moreover, the movement of the deck board 30 is achieved by utilizing the elastic forces of the tension springs 5. Thereby, the deck board 30 can be readily put away with less effort, and can be readily set to separate the luggage area 3 into upper and lower areas.

Embodiment 2

Hereinafter, an embodiment 2 of the present invention will be explained with reference to FIGS. 11 to 13. In the present embodiment, a deck board 40 slightly differs in construction from the deck board 30 of the embodiment 1.

The other constructions similar to those of the embodiment 1 are designated by the same symbols, and explanations for the same constructions, operations and effects thereof are omitted.

In the present embodiment, a single tension spring 5 is provided on the deck board 40, in contrast to the embodiment 1. Specifically, the front support portion 32 and the front board 31A of the board body 31 are separated into three areas R, M, L by slits formed thereon, in a similar manner to the embodiment 1. However, the slits of the present embodiment differ in position from those of the embodiment 1.

The slits of the present embodiment are arranged nearer the center of the front support portion 32 or the board body 31 in the vehicle width direction, and thereby a narrower middle area M is provided. The single tension spring 5 is arranged in the middle area M, while a tension spring 5 is not provided in the right or left area R, L.

First hinge portions 35A for rotatably connecting the front board 31A to the front support portion 32 are provided in the right and left areas R, L. A second hinge portion 35B for rotatably connecting the front board 31A to the front support portion 32 is provided in the middle area M. Further, a third hinge portion 35C for rotatably connecting the rear board 31B to the front board 31A is provided in the middle area M. In the right and left areas R, L, the rear board 31B is connected to the front board 31A so as not to be rotatable and so as to together form a single board.

According to the construction, the deck board 40 can be readily moved between the upper and lower positions in a similar manner to the embodiment 1.

Figure 11:
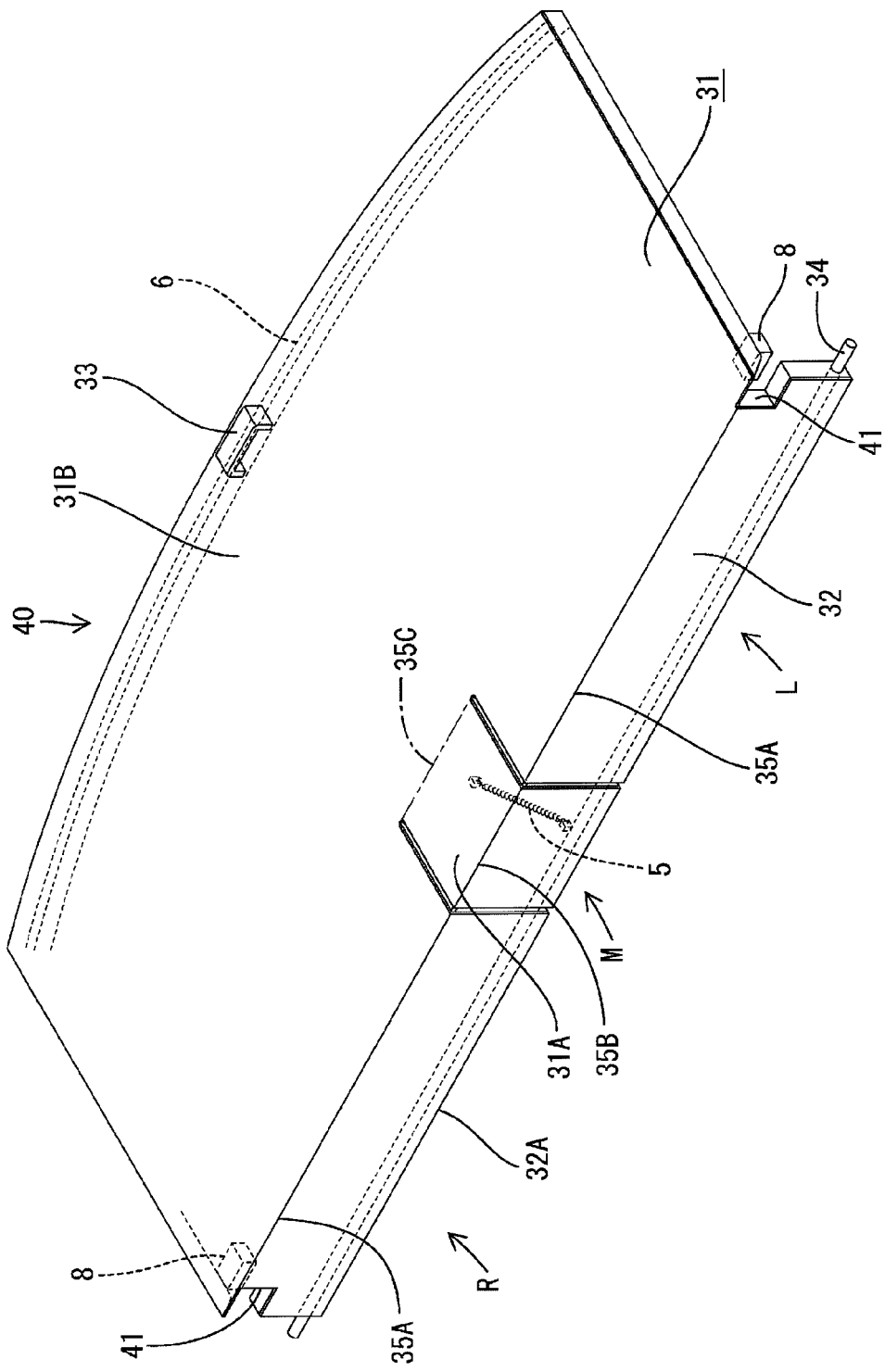
FIG. 11 is a perspective view showing the top surface of a deck board arranged in the upper position, according to an embodiment 2.

Referring to FIG. 11, recess portions 41 are formed on the respective lateral sides of the front support portion 32, so that the front support portion 32 during rotation can be prevented from interference with side support portions 8 described below.

In the present embodiment, a pair of side support portions 8 (i.e., an example of "protrusions" of the present invention) are provided as protrusions on the respective sidewalls 3D of the undertray 3A. As shown in FIG. 13, the side support portions 8 support the respective lateral sides of the board body 31 when the deck board 40 is arranged in the upper position. The side support portions 8 can pass through the recess portions 41 of the front support portion 32, when the front support portion 32 rotates.

Figure 12:
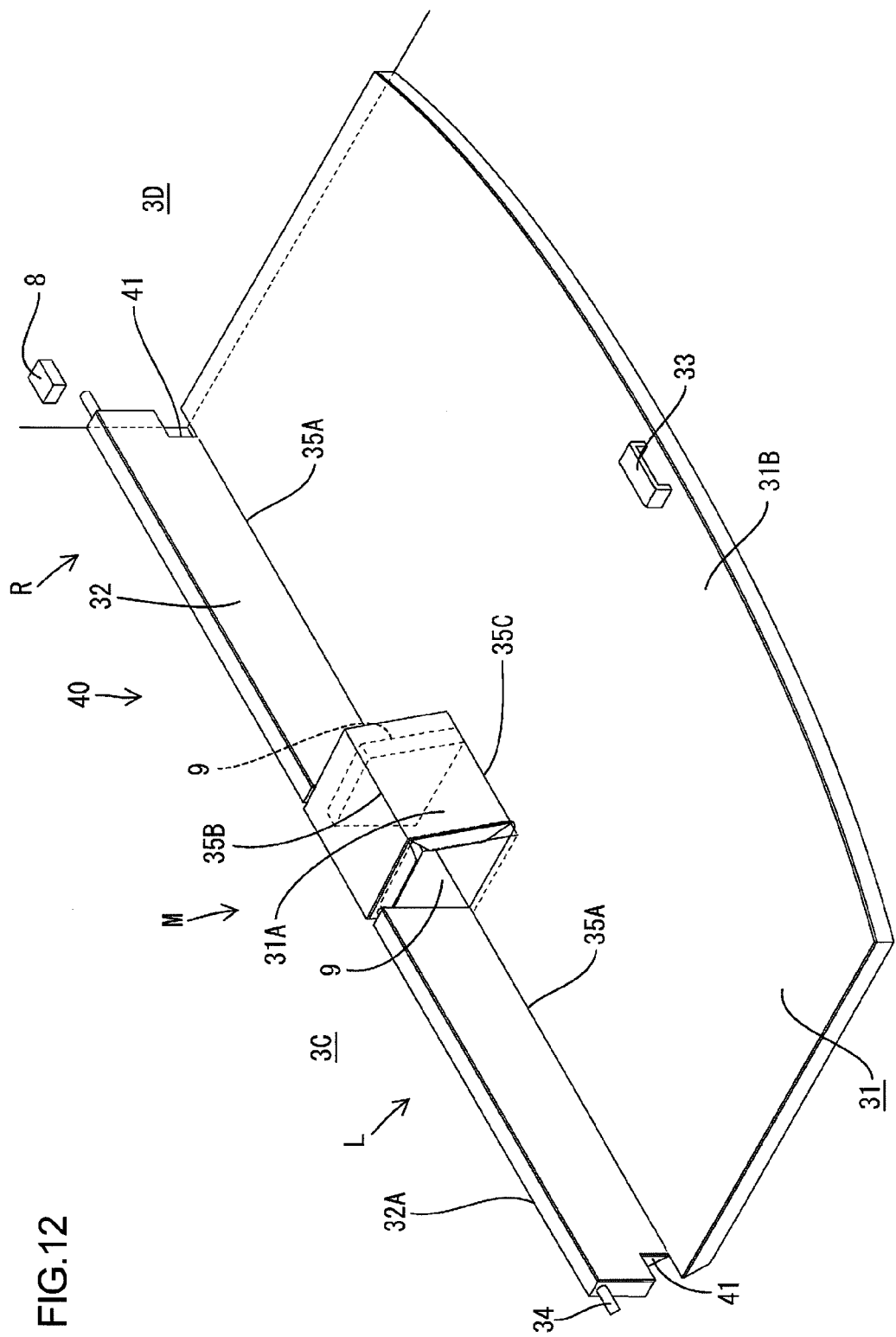
FIG. 12 is a top perspective view of a luggage area when the deck board is arranged in the lower position.
Figure 13:
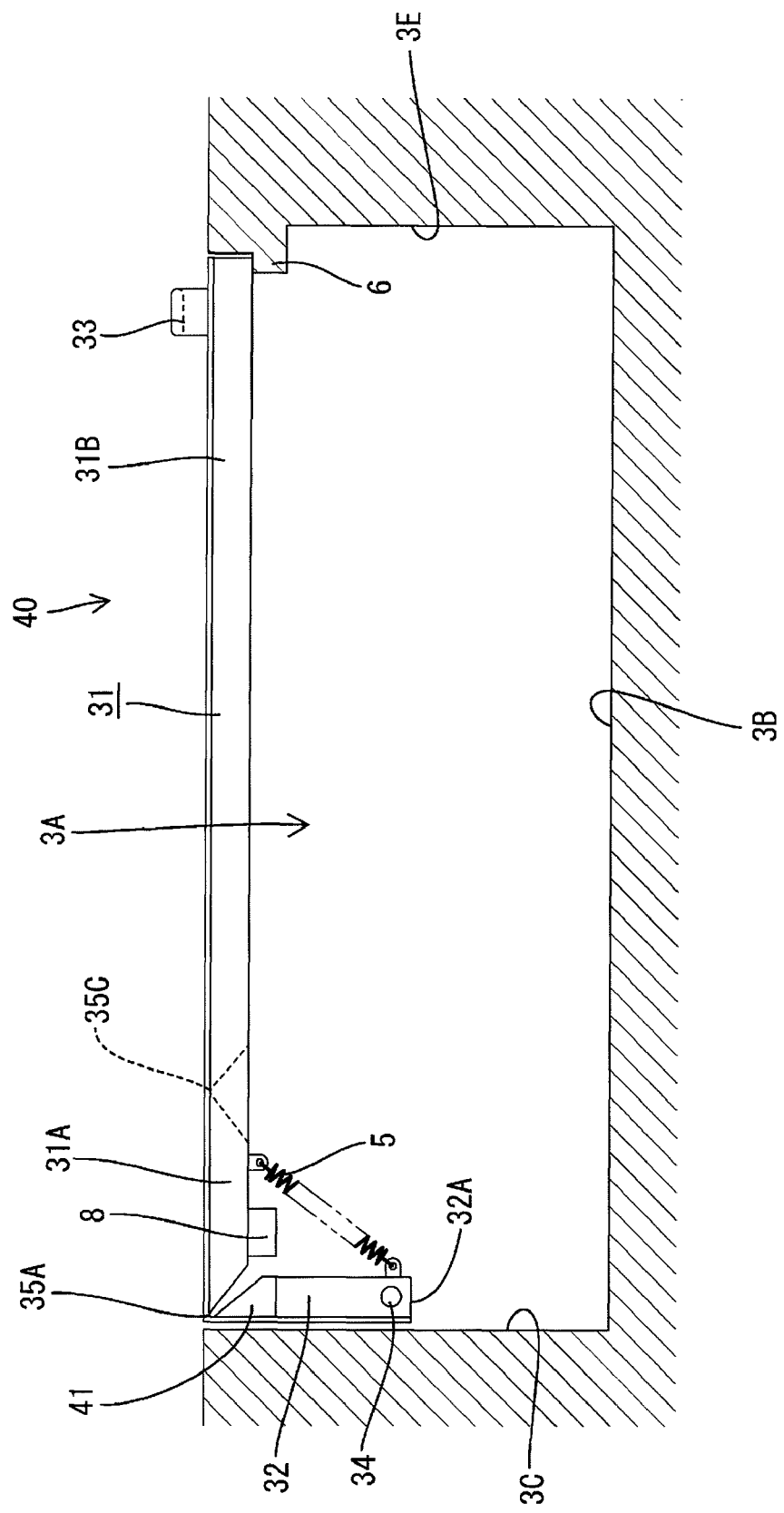
FIG. 13 is a cross-sectional side view showing the deck board arranged in the upper position.

Referring to FIG. 12, a pair of protective walls 9 are provided so as to be positioned in the vehicle width direction substantially at the center of the floor 3B of the undertray 3A, in contrast to the protective walls 7 of the embodiment 1. The protective walls 9 are arranged on the lateral sides of the tension spring 5 when the deck board 40 is set in the lower position.

According to the present embodiment, the board body 31 in the upper position is supported by the front support portion 32, the side support portions 8 and the rear support portion 6. Therefore, a bulky luggage can be stably held on the deck board 40.

Modifications

The present invention is not limited to the embodiments explained in the above description made with reference to the drawings. The following embodiments may be included in the technical scope of the present invention, for example.

(1) In the above embodiments, the hinge portions 35A, 35B, 35C of the deck board 30, 40 are formed of flexible portions. However, according to the present invention, hinge braces may be used instead.

(2) In the above embodiment 1, the tension springs 5 are provided on the deck board 30 so as not to bulge laterally from the lateral sides of the deck board 30. However, according to the present invention, tension springs 5 may be provided so as to bulge laterally from the lateral sides of the deck board 30. In this case, the front end portion of the deck board 30 need not necessarily be separated into three areas.

(3) In the above embodiments, the front end portion of the deck board 30 is separated into three areas arranged along the vehicle width direction. However, according to the present invention, the front end portion of the deck board 30 may be separated into two areas or four or more areas.

(4) In the above embodiment 1, the protective walls 7 are provided on the respective lateral sides of each tension spring 5. However, according to the present invention, a protective wall 7 may be provided on one lateral side of each tension spring 5 on the side of the luggage area 3.

(5) In the above embodiments, the board body 31 in the lower position is arranged on the floor 3B. However, according to the present invention, the lower position of the board body 31 may be set slightly above the floor 3B.

What is claimed is:

1. A deck board comprising:
 a board body arranged in a luggage area of a vehicle so as to be capable of being moved between an upper position and a lower position, said board body in the upper position separating said luggage area into upper and lower areas, said board body in the lower position being arranged on a side of a floor of said luggage area;
 a front support portion that is rotatably connected to a front side of said board body so as to support the front side of said board body;
 a support pin that pivotally supports an end portion of said front support portion on an opposite side of said board body so that a connecting portion between said front support portion and said board body is rotatable; and
 a biasing device arranged to bias the front side of said board body toward said support pin.

2. A deck board as in claim 1, wherein:
 said board body includes a front board arranged in a front side and a rear board arranged in a rear side;
 said front support portion and said front board are separated into a plurality of areas arranged along a vehicle width direction, by at least one slit that is formed thereon so as to extend in a front-to-rear direction;
 said biasing device is arranged in at least one area of said plurality of areas so as to connect between said front support portion and said front board; and
 a rear end portion of said at least one area is rotatably connected to said rear board so that said at least one area is rotatable separately from another area of said plurality of areas.

3. A deck board as in claim 1, wherein a pair of recess portions are provided on lateral sides of said front support portion so that a pair of protrusions, which are provided in said luggage area for supporting lateral sides of said board body in the upper position, pass through said recess portions when said front support portion rotates.

4. A deck board as in claim 2, wherein a pair of recess portions are provided on lateral sides of said front support portion so that a pair of protrusions, which are provided in said luggage area for supporting lateral sides of said board body in the upper position, pass through said recess portions when said front support portion rotates.

5. A mounting structure of a deck board, comprising:
a deck board as in claim 1; and
a rear support portion provided on a rear wall on a rear side of said luggage area so as to support a rear side of said board body in the upper position;
wherein said support pin is detachably supported on sidewalls on lateral sides of said luggage area.

6. A mounting structure of a deck board, comprising:
a deck board as in claim 3; and
a rear support portion provided on a rear wall on a rear side of said luggage area so as to support a rear side of said board body in the upper position;
wherein said support pin is detachably supported on sidewalls on lateral sides of said luggage area.

7. A mounting structure of a deck board, comprising:
a deck board as in claim 4; and
a rear support portion provided on a rear wall on a rear side of said luggage area so as to support a rear side of said board body in the upper position;
wherein said support pin is detachably supported on sidewalls on lateral sides of said luggage area.

8. A mounting structure of a deck board, as in claim 5, wherein a protective wall is provided on a floor of said luggage area so as to be arranged on a lateral side of said biasing device when said board body is in the lower position.

9. A mounting structure of a deck board, as in claim 6, wherein a protective wall is provided on a floor of said luggage area so as to be arranged on a lateral side of said biasing device when said board body is in the lower position.

10. A mounting structure of a deck board, as in claim 7, wherein a protective wall is provided on a floor of said luggage area so as to be arranged on a lateral side of said biasing device when said board body is in the lower position.

11. A deck board comprising:
a board body arranged in a luggage area of a vehicle so as to be capable of being moved between an upper position and a lower position, said board body in the upper position separating said luggage area into upper and lower areas, said board body in the lower position being arranged on a side of a floor of said luggage area;
a front support portion that is rotatably connected to a front side of said board body so as to support the front side of said board body;
a support pin that pivotally supports an end portion of said front support portion on an opposite side of said board body so that a connecting portion between said front support portion and said board body is rotatable; and
a biasing device arranged to bias the front side of said board body toward said support pin, wherein:
said board body includes a front board arranged in a front side and a rear board arranged in a rear side;
said front support portion and said front board are separated into a plurality of areas arranged along a vehicle width direction, by at least one slit that is formed thereon so as to extend in a front-to-rear direction;
said biasing device is arranged in at least one area of said plurality of areas so as to connect between said front support portion and said front board; and
a rear end portion of said at least one area is rotatably connected to said rear board so that said at least one area is rotatable separately from another area of said plurality of areas.

12. A deck board as in claim 11, wherein a pair of recess portions are provided on lateral sides of said front support portion so that a pair of protrusions, which are provided in said luggage area for supporting lateral sides of said board body in the upper position, pass through said recess portions when said front support portion rotates.

13. A mounting structure of a deck board, comprising:
a deck board as in claim 11; and
a rear support portion provided on a rear wall on a rear side of said luggage area so as to support a rear side of said board body in the upper position;
wherein said support pin is detachably supported on sidewalls on lateral sides of said luggage area.

14. A mounting structure of a deck board, comprising:
a deck board as in claim 12; and
a rear support portion provided on a rear wall on a rear side of said luggage area so as to support a rear side of said board body in the upper position;
wherein said support pin is detachably supported on sidewalls on lateral sides of said luggage area.

15. A mounting structure of a deck board, as in claim 13, wherein a protective wall is provided on a floor of said luggage area so as to be arranged on a lateral side of said biasing device when said board body is in the lower position.

16. A mounting structure of a deck board, as in claim 14, wherein a protective wall is provided on a floor of said luggage area so as to be arranged on a lateral side of said biasing device when said board body is in the lower position.

17. A deck board comprising:
a board body arranged in a luggage area of a vehicle so as to be capable of being moved between an upper position and a lower position, said board body in the upper position separating said luggage area into upper and lower areas, said board body in the lower position being arranged on a side of a floor of said luggage area;
a front support portion that is rotatably connected to a front side of said board body so as to support the front side of said board body;
a support pin that pivotally supports an end portion of said front support portion on an opposite side of said board body so that a connecting portion between said front support portion and said board body is rotatable; and
a biasing device arranged to bias the front side of said board body toward said support pin;
wherein a pair of recess portions are provided on lateral sides of said front support portion so that a pair of protrusions, which are provided in said luggage area for supporting lateral sides of said board body in the upper position, pass through said recess portions when said front support portion rotates.

18. A mounting structure of a deck board, comprising:
a deck board as in claim 17; and
a rear support portion provided on a rear wall on a rear side of said luggage area so as to support a rear side of said board body in the upper position;
wherein said support pin is detachably supported on sidewalls on lateral sides of said luggage area.

19. A mounting structure of a deck board, as in claim 18, wherein a protective wall is provided on a floor of said luggage area so as to be arranged on a lateral side of said biasing device when said board body is in the lower position.

* * * * *